United States Patent
Narey et al.

(10) Patent No.: US 9,250,919 B1
(45) Date of Patent: Feb. 2, 2016

(54) MULTIPLE FIRMWARE IMAGE SUPPORT IN A SINGLE MEMORY DEVICE

(71) Applicant: American Megatrends, Inc., Norcross, GA (US)

(72) Inventors: Jacob Narey, Lawrenceville, GA (US); Will Gysin, Jefferson, GA (US)

(73) Assignee: American Megatrends, Inc., Norcross, GA (US)

( * ) Notice: Subject to any disclaimer, the term of this patent is extended or adjusted under 35 U.S.C. 154(b) by 274 days.

(21) Appl. No.: 13/766,153

(22) Filed: Feb. 13, 2013

(51) Int. Cl.
  *G06F 9/44* (2006.01)
(52) U.S. Cl.
  CPC .................................. *G06F 9/4401* (2013.01)
(58) Field of Classification Search
  CPC ............................. G06F 9/4401; G06F 9/441
  USPC ............................................................. 713/2
  See application file for complete search history.

(56) References Cited

U.S. PATENT DOCUMENTS

| | | | |
|---|---|---|---|
| 6,425,079 B1* | 7/2002 | Mahmoud | 713/2 |
| 7,930,534 B2* | 4/2011 | Fu | 713/2 |
| 2002/0091919 A1* | 7/2002 | Goodman et al. | 713/2 |
| 2002/0103993 A1* | 8/2002 | Alexander et al. | 713/1 |
| 2003/0221092 A1* | 11/2003 | Ballard et al. | 713/1 |
| 2007/0157015 A1* | 7/2007 | Swanson et al. | 713/2 |
| 2013/0332719 A1* | 12/2013 | Hormuth et al. | 713/2 |

* cited by examiner

*Primary Examiner* — Albert Wang
(74) *Attorney, Agent, or Firm* — Lee & Hayes, PLLC (57) ABSTRACT

A computing device is configured with a single memory device having multiple firmware images stored therein. At a boot time of the computing device, one of the firmware images is selected for use in booting the computing device. The selection of the firmware image to use for booting the computing device might be based upon the state of a hardware jumper, a board revision identifier, a silicon revision identifier, the results of a checksum operation, the presence or absence of one or more peripheral devices, user-specified settings, and/or one or more other factors. Firmware images might be stored in the single memory device in various combinations that include, but are not limited to, a fast-boot firmware, a full functionality firmware, a recovery firmware, a diagnostic firmware, a motherboard-specific firmware, an operating system-specific firmware, a pre-operating system operating environment firmware, an application-specific firmware, and/or a pre-operating system application firmware.

24 Claims, 6 Drawing Sheets

MULTIPLE FIRMWARE IMAGE SUPPORT IN A SINGLE MEMORY DEVICE

BACKGROUND

Most computing devices utilize a firmware to control their low-level operation. The firmware is typically tied closely to the particular hardware components of the computing device. The firmware is generally stored in a non-volatile memory device, such as a read only memory ("ROM"), erasable programmable read only memory ("EPROM"), or a flash memory device. The firmware might be periodically updated in order to fix bugs or introduce new functionality.

In many types of computing devices, the firmware provides functionality for performing a power-on self-test ("POST") of the computing device, for booting the computing device (which might also be referred to as performing an initial program load ("IPL")), for providing interfaces to the low-level operation of the hardware of the computing device to an operating system executing on the computing device, and for performing other types of functions.

Many desktop, laptop, and server computers utilize a firmware known as a Basic Input and Output System ("BIOS"). The BIOS includes low-level instruction code that is used as an intermediary between the hardware components of the computing system and the operating system and other high-level software executing on the computing system. For example, the BIOS might provide a set of software routines that allow high-level software to interact with the hardware components of the computing device using standard calls.

Other desktop, laptop, and server computers might utilize a firmware that is compatible with the Unified Extensible Firmware Interface ("UEFI") Specification from INTEL CORPORATION or the OPEN FIRMWARE specification from SUN MICROSYSTEMS. Smartphone, tablet, e-reader, and set-top box computing devices might utilize other types of open and proprietary firmware to control various aspects of their operation.

It is with respect to these and other considerations that the disclosure made herein is presented.

SUMMARY

Technologies are described herein for providing multiple firmware image support in a single memory device. Through the utilization of the concepts and technologies presented herein, a computing device can be configured with a single memory device, such as a ROM, EPROM, or flash memory device, which stores multiple firmware images. At boot time of the computing device, the computing device can select one of the multiple firmware images for use in booting the computing device. Configuring a computing device in this way may reduce manufacturing costs as compared to previous systems that utilized multiple memory devices. The embodiments disclosed herein might also simplify manufacturing by configuring a single memory device with firmware images that support different hardware configurations. In this way, the same memory device can be utilized with multiple hardware configurations.

According to one aspect presented herein, a computing device, such as a desktop, laptop, or server computer, is configured with a single memory device, such as a ROM, EPROM, or flash memory device. The single memory device is configured with multiple (i.e. two or more) firmware images. Each of the firmware images contains a firmware for controlling aspects of the operation of the computing device. For example, and as described above, the firmware might provide functionality for performing a POST of the computing device, for booting the computing device, for providing interfaces to the low-level operation of the hardware of the computing device to an operating system executing on the computing device, and for performing other types of functions.

At a boot time of the computing device, one of the firmware images in the single memory device is selected for use in booting the computing device. The selection of the particular firmware image to utilize for booting the device might be made based upon various factors in various embodiments disclosed herein. For example, in one particular implementation, the computing device includes one or more hardware jumpers. As known in the art, a hardware jumper is a short length of conductor used to close a break in, or bypass part of, an electrical circuit. In this embodiment, the hardware jumper, or jumpers, may be utilized to specify which of several firmware images is to be utilized to boot the computing device. Based upon the state of the hardware jumpers, one of the firmware images in the single memory device is selected and utilized to boot the computing device.

In another implementation, the computing device includes a "motherboard" or similar type of system board. A motherboard is a printed circuit board to which one or more processors and the single memory device may be connected by way of a system bus or other electrical communication path. In some implementations, the motherboard has an associated board revision identifier that identifies the particular hardware revision of the board. One or more components on the motherboard might also have an associated silicon revision identifier that identifies the particular revision of the components. In these embodiments, the board revision identifier and/or the silicon revision identifier might be utilized to select one of the firmware images stored on the single memory device for use in booting the computing device. For example, a firmware image appropriate for use with a motherboard having a particular board revision identifier or a component having a particular silicon revision identifier might be selected for use in operating a computing device.

In another implementation, a checksum operation might be performed on one of the firmware images stored in the single memory device. As known in the art, a checksum or hash sum is a fixed-size datum computed from an arbitrary block of digital data for the purpose of detecting accidental errors. The integrity of the data can be checked at any later time by re-computing the checksum and comparing it with the stored one. If the checksums match, the data was likely not altered. In this implementation, a checksum is computed for one of the firmware images and compared against a previously stored checksum for the firmware image. If the checksum matches, the firmware image is utilized to boot the computing device. If the checksum does not match, another firmware image stored in the single memory device might be utilized to boot the computing device.

In another implementation, a firmware image stored in the single memory device may be selected for use in booting the computing device based upon whether a particular peripheral device, or devices, is connected to the computing device at boot time. For example, the computing device might determine whether a keyboard or video display is connected. If the keyboard or video display is not connected, one of the firmware images stored in the single memory device might be utilized. If the keyboard or video display is not connected, another one of the firmware images stored in the single memory device might be utilized.

In other implementation, one of the firmware images includes a configuration program that provides functionality for allowing a user to select one of the firmware images stored in the single memory device for use in booting the computing device. Data identifying the firmware images selected by the user may be stored in the single memory device or in another location. At boot time, the firmware image specified by the user may be utilized to boot the computing device.

According to various embodiments, various combinations of firmware images might be stored in the single memory device. For example, a fast-boot firmware might be stored in the single memory device. A fast-boot firmware is a firmware that is optimized for quickly booting a computing device. In order to provide a fast boot time, many types of functionality might be removed from a fast-boot firmware. A fast-boot firmware might be stored in a single memory device that also contains a full functionality firmware. A full functionality firmware does not have any functionality removed. For example, a full functionality firmware might include a full BIOS implementation or an implementation that is fully compatible with the UEFI or OPEN FIRMWARE specification.

In some embodiments, a recovery firmware might also be stored in a single memory device alone with one or more other firmware images. A recovery firmware provides functionality for repairing or restoring another firmware image in the event of a detected problem (e.g. an invalid checksum). In this regard, a diagnostic firmware might also be stored in the single memory device that provides functionality for diagnosing hardware issues and types of failures.

In other implementations, the single memory device includes a motherboard-specific firmware. A motherboard-specific firmware is a firmware that has been customized for the hardware configuration of a particular motherboard. In one implementation, multiple different motherboard-specific firmware images might be stored in the same single memory device. At boot time, the appropriate motherboard-specific firmware may be selected based upon the hardware configuration of the computing device. In this way, the same single memory device can be configured to support many different hardware configurations.

In another embodiment, the single memory device includes an operating system-specific firmware. An operating system-specific firmware is a firmware that has been customized for use with a particular operating system. In one implementation, multiple different operating system-specific firmware images might be stored in the same single memory device. At boot time, the appropriate operating system-specific firmware may be selected based upon the operating system used to boot the computing device. In this way, the same single memory device can be configured for optimized use with many different operating systems. In a similar fashion, an application-specific firmware might be stored in the single memory device that is optimized for use with a particular application. For example, a firmware image might be provided that is optimized for use with a game or other type of application that has high performance requirements.

In yet another embodiment, the single memory device includes a pre-operating system operating environment firmware that provides a firmware-based execution environment. For example, the firmware-based execution environment might provide functionality for playing digital music files, checking electronic mail ("e-mail"), or other basic functionality without the need to boot into an operating system. In a similar fashion, the single memory device might include a pre-operating system application firmware. The pre-operating system application firmware is configured to execute a particular firmware application. As mentioned above, executing an application by way of the firmware might allow a user to perform certain functionality without booting the computing device into an operating system. A pre-operating system operating environment firmware and/or a pre-operating system application firmware might be stored in the same memory device with a full functionality firmware. In this way, a user can utilize both a pre-operating system environment when desired and utilize the full functionality firmware to boot into an operating system when desired.

It should be appreciated that firmware images for implementing the various types of firmware described above might be stored in the single memory device in various combinations to achieve various types of desired functionality. It should also be appreciated that the various types of firmware images described above are merely illustrative and that other types of firmware images might be utilized with the technologies disclosed herein. It should be further appreciated that the above-described subject matter may also be implemented as a computer-controlled apparatus, a computer process, a computing device or system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Embodiments of the disclosure presented herein include methods, systems, apparatuses, devices, and computer-readable storage media for providing multiple firmware image support in a single memory device. In the following detailed description, references are made to the accompanying drawings that form a part hereof, and in which are shown by way of illustration specific embodiments or examples. Referring now to the drawings, in which like numerals represent like elements throughout the several figures, aspects of various embodiments provided herein will be described.

Figure 1:
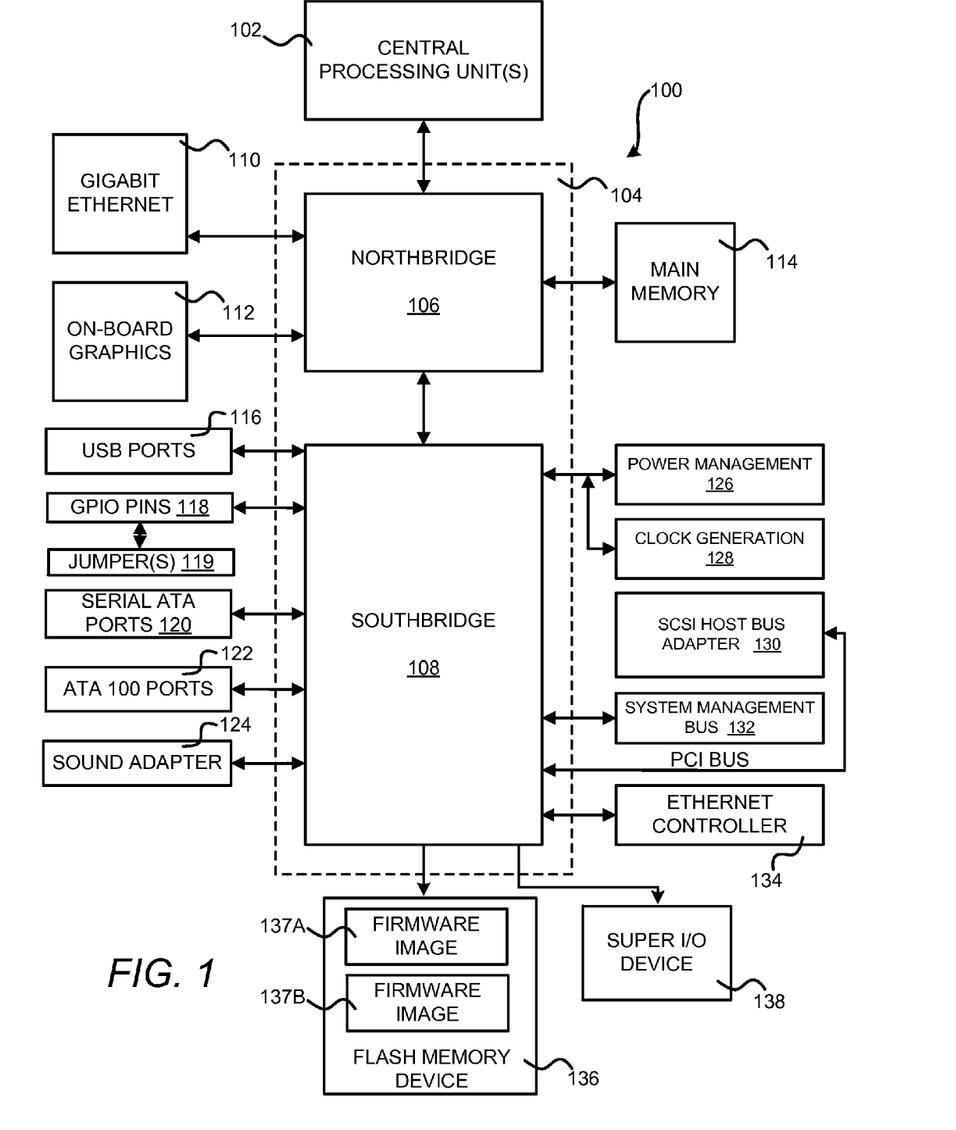
FIG. 1 is a computer architecture diagram that illustrates various components of a computing device that has been configured to provide the functionality disclosed herein for supporting multiple firmware images in a single memory device.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like.

Turning now to FIG. 1, an illustrative computer architecture for practicing one or more of the embodiments discussed herein will be described. It should be appreciated that although the embodiments described herein are discussed in the context of a conventional desktop, laptop, or server computer, the embodiments may be utilized with virtually any type of computing device that utilizes a firmware to control aspects of its operation. For example, the embodiments disclosed herein might be utilized with smartphones, tablet computing devices, e-readers, set-top boxes, and other types of computing devices. These devices might be referred to herein as a "computer" or a "computing device." FIG. 1 shows an illustrative computer architecture for a computer 100 that is operative to provide the functionality described herein for multiple firmware image support in a single memory device.

In order to provide the functionality described herein, the computer 100 can include a baseboard, or motherboard. The motherboard can be a printed circuit board to which some or all of the components shown in FIG. 1 may be connected by way of a system bus or other electrical communication path. In particular, in one illustrative embodiment, the motherboard includes one or more central processing units ("CPU") 102 configured to operate in conjunction with a chipset 104. The CPU 102 may be a standard central processor that performs arithmetic and logical operations necessary for the operation of the computer. For example, the CPU 102 might be a CPU available from INTEL CORPORATION, AMD CORPORATION, or a CPU based upon the ARM architecture from ARM HOLDINGS. Other types of CPUs might also be utilized.

The CPU 102 may be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

In one implementation, the chipset 104 includes a northbridge 106 and a southbridge 108. The northbridge 106 provides an interface between the CPU 102 and the remainder of the computer 100. The northbridge 106 also provides an interface to a random access memory ("RAM") used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the Ethernet adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus ("USB") ports 116, a sound adapter 124, an Ethernet controller 134, and one or more general purpose input/output ("GPIO") pins 118. One or more hardware jumpers 119 might be connected to the GPIO pins. As discussed above, a hardware jumper 119 is a short length of conductor used to close a break in, or bypass part of, an electrical circuit. As will be described in greater detail below, the hardware jumpers 119 may be utilized to specify which of several firmware images is to be utilized to boot the computer 100.

The southbridge 108 may also provide a bus for interfacing peripheral card devices such as a SCSI host bus adapter 130. In one embodiment, the bus comprises a peripheral component interconnect ("PCI") bus. The southbridge 108 may also provide a system management bus 132 for use in managing the various components of the computer 100. Power management circuitry 126 and clock generation circuitry 128 may also be utilized during the operation of the southbridge 108.

The southbridge 108 is also operative to provide one or more interfaces for connecting mass storage devices to the computer 100. For instance, according to an embodiment, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices (not shown) storing an operating system and application programs. As known to those skilled in the art, an operating system comprises a program, or set of programs, that controls the operation of a compute. An application program is software that runs on top of the operating system software and uses computer resources made available through the operating system to perform application specific tasks desired by the user.

The mass storage devices connected to the southbridge 108 and the SCSI host bus adapter 130, and their associated computer-readable storage media, provide non-volatile storage for the computer 100. Although the description of computer-readable storage media contained herein refers to a mass storage device, such as a hard disk or CD-ROM drive, it should be appreciated by those skilled in the art that computer-storage media can be any available media that can be accessed by the computer 100. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer-readable storage media such as a ROM, EPROM, or flash memory device 136.

In the example shown in FIG. 1, a single flash memory device 136 has been utilized. It should be appreciated that, in other embodiments, a single ROM, EPROM, or other type of non-volatile memory device might also be utilized. Accordingly, although a flash memory device is shown in FIG. 1, the term "single memory device 136" will be utilized herein to refer to the single memory device that is utilized to store multiple firmware images in the manner presented herein.

As shown in FIG. 1, the single memory device 136 might be configured to store two or more firmware images 137A-137B (which might be referred to herein individually as "a firmware image 137" or collectively as "the firmware images 137"). As described briefly above, the firmware stored in the firmware images 137 might provide functionality for performing a POST of the computer 100, for booting the computer 100, for providing interfaces to the low-level operation of the hardware of the computer 100 to an operating system executing on the computer 100, and for performing other types of functions.

In various embodiments, the firmware images 137 might include a BIOS firmware, a firmware that is compatible with the UEFI Specification, a firmware that is compatible with the OPEN FIRMWARE specification, or another type of firmware. Additional details regarding the various combinations of firmware images 137 that might be stored in the single memory device 136 will be provided below with regard to FIGS. 4A-4H.

In some embodiments, and as will be described in greater detail below, the firmware used to boot the computer 100 might utilize a portion of the single memory device 136 to store configuration data for the computer 100. For example, the single memory device 136 might be utilized to store data indicating which of the several firmware images 137 stored in the single memory device 136 should be utilized to boot the computer 100.

It should be appreciated that the program modules disclosed herein, including the firmware contained in the firmware images 137, may include software instructions that, when loaded into the CPU 102 and executed, transform a general-purpose computing system into a special-purpose computing system customized to facilitate all, or part of, the operations disclosed herein. As detailed throughout this description, the program modules may provide various tools or techniques by which the computer 100 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces 110, 134, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of a semiconductor memory when the software or firmware is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computer 100 may comprise other types of computing devices, including hand-held computers, embedded computer systems, personal digital assistants, table computing devices, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
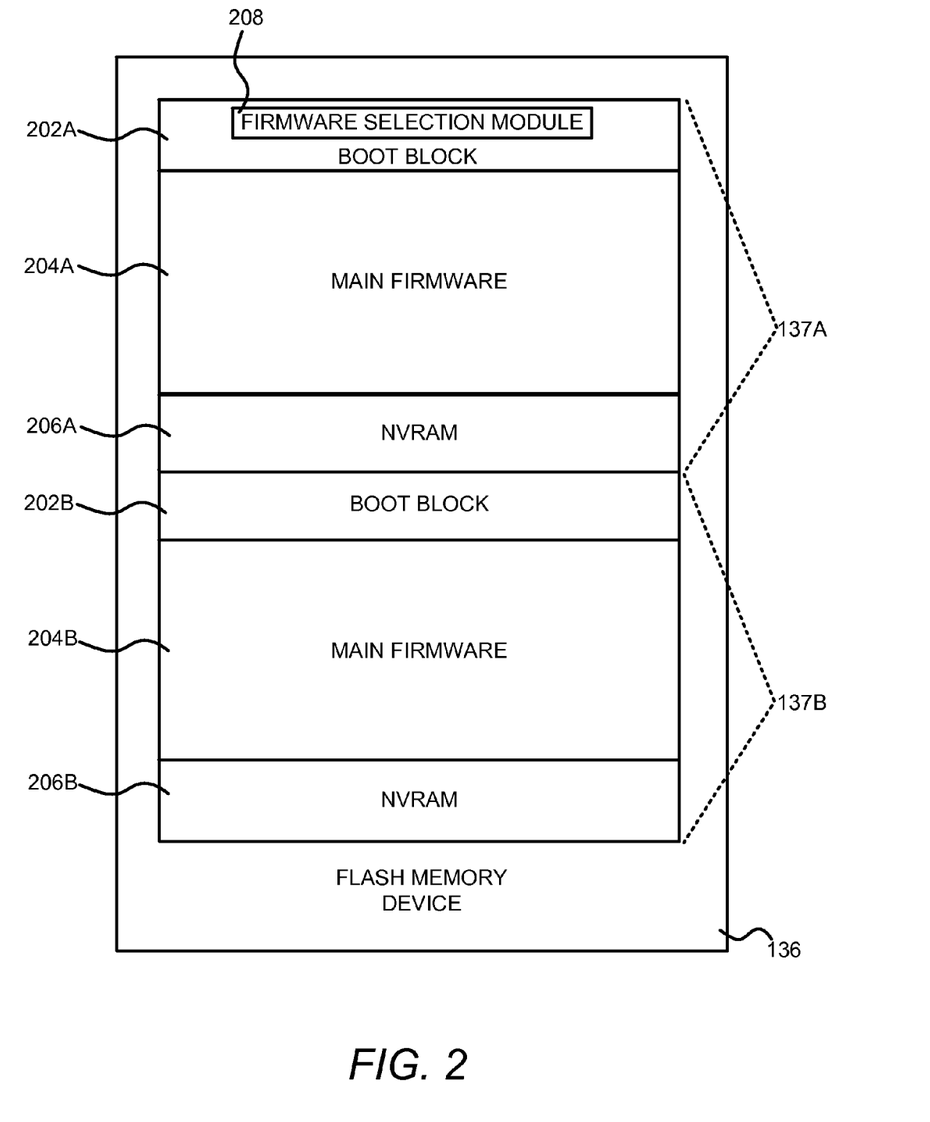
FIG. 2 is a data structure diagram showing aspects of the configuration of a single memory device containing multiple firmware images, according to one embodiment disclosed herein.

FIG. 2 is a data structure diagram showing aspects of the configuration of a single memory device 136 containing multiple firmware images 137, according to one embodiment disclosed herein. In particular, the single memory device 136 shown in FIG. 2 has been configured with two firmware images 137A and 137B. As mentioned above, more than two firmware images 137 might be utilized in other embodiments.

As shown in FIG. 2, the firmware image 137A includes a boot block portion 202A. The boot block portion 202A is a portion of a firmware responsible for initiating the boot of the firmware image 137A. For example, the boot block portion 202A might include program code for initializing hardware, for performing security functions, and for performing other functionality relating to the booting of the remainder of the firmware (shown in FIG. 2 as main firmware 204A).

As also shown in FIG. 2, the boot block portion 202A of the firmware image 137A includes a firmware selection module 208. The firmware selection module 208 performs the functionality disclosed herein for selecting one of the firmware images 137A or 137B to be used for booting the computer 100. In the embodiment shown in FIG. 2, the firmware selection module 208 is contained in the boot block 202A of the firmware 137A. In other embodiments, however, the firmware selection module 208 might be located outside of the firmware 137A and executed prior to the execution of either the firmware image 137A or the firmware image 137B. Other implementations might also be utilized.

As indicated in FIG. 2, the firmware image 137A might also include a non-volatile random access memory ("NVRAM") area 206A. The NVRAM area 206A might be utilized by the firmware contained in the firmware image 137A to store information regarding the configuration of the firmware and the computer 100. For example, in one embodiment, the firmware contained in the firmware image 137 is configured to provide a configuration program through which a user of the computer 100 may specify which of the firmware images 137A and 137B to utilize to boot the computer 100. In this embodiment, data identifying the selected firmware image 137 might be stored in the NVRAM area 206A. As will be described in greater detail below, the firmware selection module 208 might retrieve the data from the NVRAM area 206A at boot time to identify the firmware image 137 that should be utilized to boot the computer 100. Other types of data might also be stored in the NVRAM area 206A in other embodiments.

The single memory device 136 shown in FIG. 2 also includes a second firmware image 137B. This firmware image 137B is configured similarly to the firmware image 137A, but is located in a different area of the single memory device 136. As shown in FIG. 2, the firmware image 137B also includes a boot block portion 202B for use in booting the firmware contained in the firmware image 137B, a main firmware 204B, and an NVRAM area 206B. Although two firmware images 137 have been illustrated in FIG. 2, it should be appreciated that many more firmware images 137 might be stored in a single memory device 136 in a similar fashion in other implementations.

Figure 3:
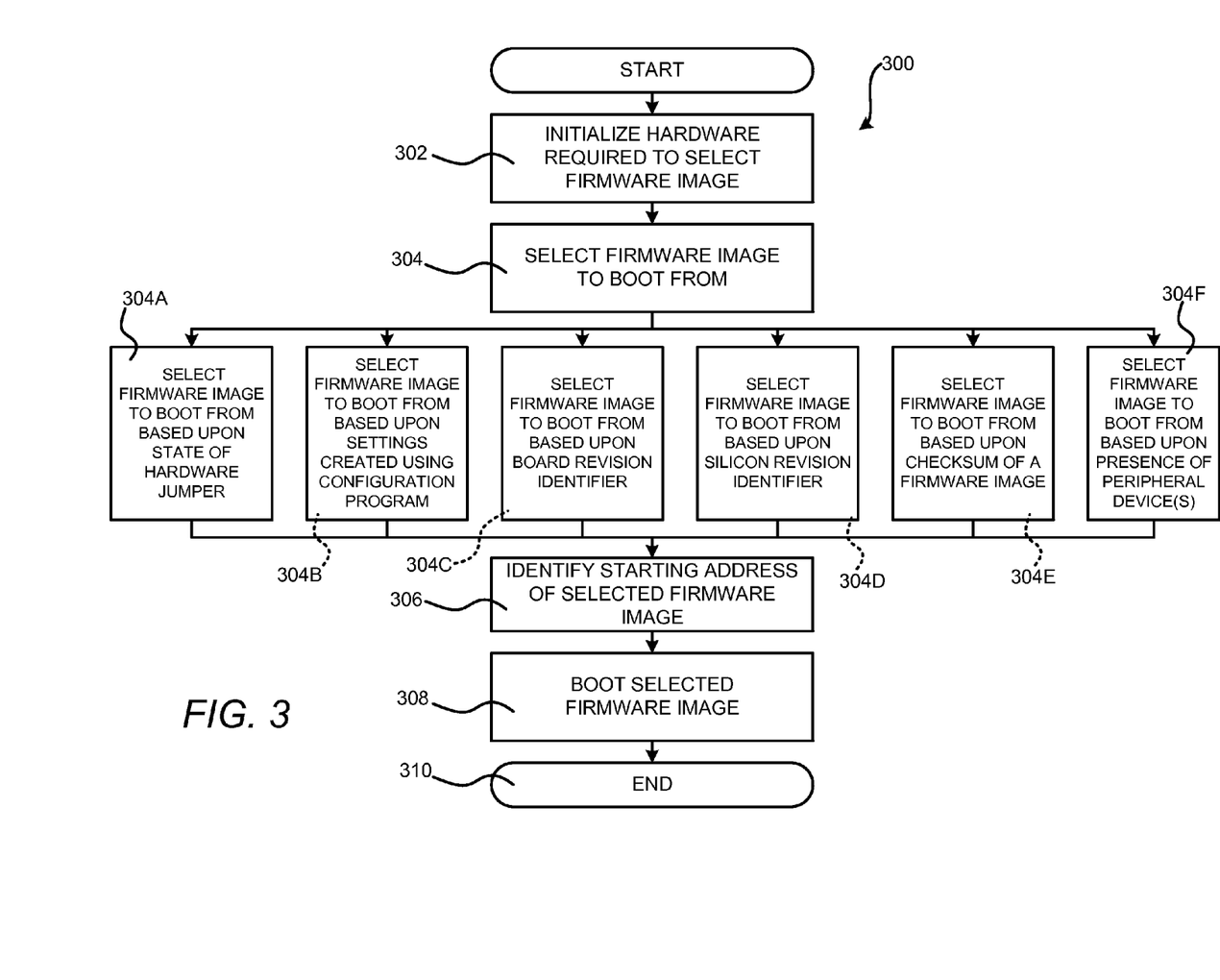
FIG. 3 is a flow diagram showing aspects of one routine utilized to provide multiple firmware image support in a single memory device, according to one embodiment disclosed herein.

Turning now to FIG. 3, additional details will be provided regarding the embodiments disclosed herein for providing multiple firmware image support in a single memory device 136. In particular, FIG. 3 is a flow diagram showing a routine 300 that illustrates aspects of one mechanism for providing multiple firmware image 137 support in a single memory device 136, according to one particular embodiment presented herein. The process illustrated in FIG. 3 may be performed by the firmware selection module 208, by other program code in one of the firmware images 137, or by another component altogether.

It should be appreciated that the logical operations described herein with regard to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 begins at operation 302, where any hardware required to select a firmware image 137 is initialized. For example, and as mentioned above, the state of the hardware jumpers 119 might be utilized to select a firmware image 137 for use in booting the computer 100. In this embodiment it might be necessary to initialize the GPIO pins 118 so that the state of the hardware jumpers 119 can be determined. Similarly, in some embodiments the presence or absence of certain peripherals might be utilized to select a firmware image 137 for use in booting the computer 100. In these embodiments, it might be necessary to initialize various components in order to determine whether the peripherals are present or not. Other types of software and hardware initializations might also be performed at operation 302.

From operation 302, the routine 300 proceeds to operation 304, where the firmware selection module 208, or another component, selects the firmware image 137 stored in the single memory device 136 that should be utilized to boot the computer 100. As mentioned above, the selection of the particular firmware image 137 to utilize for booting the computer 100 might be made based upon various factors in various embodiments disclosed herein. Some of these factors are illustrated at operations 304A-304F. It should be appreciated, however, that the operations shown are merely illustrative and that other factors or considerations might be utilized to select one of the firmware images 117 for use in booting the computer 100.

At operation 304A, the state of the hardware jumpers 119 may be utilized to select one of the firmware images 137 in the single memory device 136 for use in booting the computer 100. For example, a certain configuration of the jumpers 119 might be utilized to specify that the firmware image 137A be utilized to boot the computer 100. Another configuration of the jumpers 119 might be utilized to specify the firmware image 137B be utilized to boot the computer 100. It should be appreciated that other types of hardware devices other than jumpers might also be utilized to specify the firmware image 137 to be utilized. For example, dual-inline package ("DIP") switches might be utilized in other embodiments.

At operation 304B, user-specified settings might be utilized to select the firmware 137 for use in booting and operating the computer 100. As mentioned above, a firmware 137 might provide a setup application through which a user of the computer 100 can specify the firmware 137 to boot from. Data identifying the selected firmware 137 might be stored in the NVRAM area 206A and retrieved at boot time. The data can then be utilized to select the firmware 137 that should be utilized to boot and operate the computer 100.

At operation 304C, a board revision identifier associated with the motherboard of the computer 100 is utilized to select a firmware image 137 for use in booting the computer 100. As mentioned above, a board revision identifier identifies the particular hardware revision of the motherboard. As also mentioned above, one or more components on the motherboard might also have an associated silicon revision identifier that identifies the particular revision of the components. At operation 304D, a silicon revision identifier might be utilized to select one of the firmware images 137 stored on the single memory device 136 for use in booting the computer 100. For example, a firmware image 137 appropriate for use with a motherboard having a particular board revision identifier or a component having a particular silicon revision identifier might be selected for use in booting and operating the computer 100.

At operation 304E, a checksum of a firmware image 137 might be utilized to select the firmware image 137 that should be utilized to boot the computer 100. In particular, a checksum operation might be performed on one or more of the firmware images 137 stored in the single memory device 136. As discussed above, a checksum or hash sum is a fixed-size datum computed from an arbitrary block of digital data for the purpose of detecting accidental errors. The integrity of the data can be checked at any later time by re-computing the checksum and comparing it with the stored one. If the checksums match, the data was likely not altered. In this implementation, a checksum is computed for one of the firmware images 137, the firmware image 137A for example, and compared against a previously stored checksum. If the checksum matches, the firmware image 137A is utilized to boot the computer 100. If the checksum does not match, another firmware image 137, such as the firmware image 137B, stored in the single memory device 136 might be utilized to boot the computer 100.

At operation 304F, a firmware image 137 stored in the single memory device 136 might be selected for use in booting the computer 100 based upon whether a particular peripheral device is connected to the computer 100. For example, and as discussed briefly above, the computer 100 might determine whether a keyboard or video display is connected. If the keyboard or video display is not connected, one of the firmware images 137 stored in the single memory device might be utilized. If the keyboard or video display is not connected, another one of the firmware images 137 stored in the single memory device 136 might be utilized.

Once a firmware image 137 has been selected for use in booting the computer 100, the routine 300 proceeds to operation 306. At operation 306, the firmware selection module 208, or another component identifies the starting memory address of the boot block 202 of the selected firmware image 137. In various embodiments, the starting memory address of the boot block 202 of the selected firmware image 137 is located by searching the contents of the single memory device 136 for a predefined string or other type of data. In other embodiments, the starting memory address of each of the boot blocks 202 in the single memory device 137 are pre-stored and used at boot time. The starting memory address of a boot block 202 of a firmware image 137 in the single memory device 136 might also be identified in other ways in other embodiments.

Once the starting memory address of the boot block 202 of the selected firmware image 137 has been identified, the routine 300 proceeds from operation 306 to operation 308. At operation 308, the selected firmware image 137 is utilized to boot the computer 100 by executing the firmware image 137 at the starting memory address of the boot block 202 of the selected firmware image 137. The routine 300 then proceeds from operation 308 to operation 310, where it ends.

FIGS. 4A-4H are firmware configuration diagrams showing various combinations of different types of firmware images 137 in a single memory device 136, according to various embodiments disclosed herein. It should be appreciated that the various combinations of firmware images 137 shown in FIGS. 4A-4H and described below are merely illustrative, and that other combinations of different firmware image types might be utilized with the technologies disclosed herein. It should also be appreciated that although the configurations shown in FIGS. 4A-4H include two firmware images 137, other implementations might utilize more than two firmware images 137 stored in the same single memory device 136.

Figure 4A:
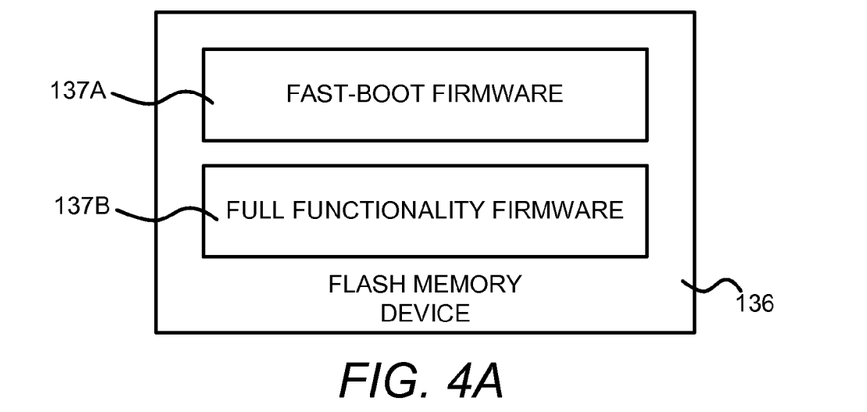
FIGS. 4A-4H are firmware configuration diagrams showing various combinations of different types of firmware images in a single memory device, according to various embodiments disclosed herein.

FIG. 4A shows one configuration of the single memory device 126 in which a firmware image 137A for a fast-boot firmware and a firmware image 137B for a full functionality firmware have been stored therein. As mentioned above, a fast-boot firmware is a firmware that is optimized for quickly booting a computing device. In order to provide a fast boot time, many types of functionality might be removed from a fast-boot firmware. As also mentioned above, a full functionality firmware does not have any functionality removed. For example, a full functionality firmware might include a full BIOS implementation or an implementation that is fully compatible with the UEFI specification or the OPEN FIRMWARE specification. In the embodiment shown in FIG. 4A, the fast-boot firmware might be utilized under certain circumstances (e.g. support for certain hardware devices is not necessary). The full functionality firmware might be utilized under different circumstances (e.g. support for a certain hardware device is necessary).

Figure 4B:
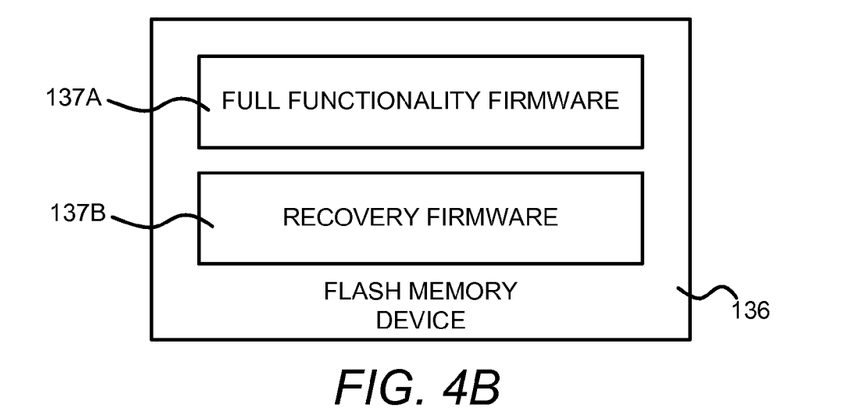

FIG. 4B shows a configuration of the single memory device 126 in which a firmware image 137A for a full functionality firmware and a firmware image 137B for a recovery firmware have been stored therein. As mentioned above, a recovery firmware provides functionality for repairing or restoring another firmware image in the event of a detected problem (e.g. an invalid checksum). In this example, the full functionality firmware might be utilized to regularly boot the computer 100. If the full functionality firmware fails, the recovery firmware might be booted in order to repair the full functionality firmware.

Figure 4C:
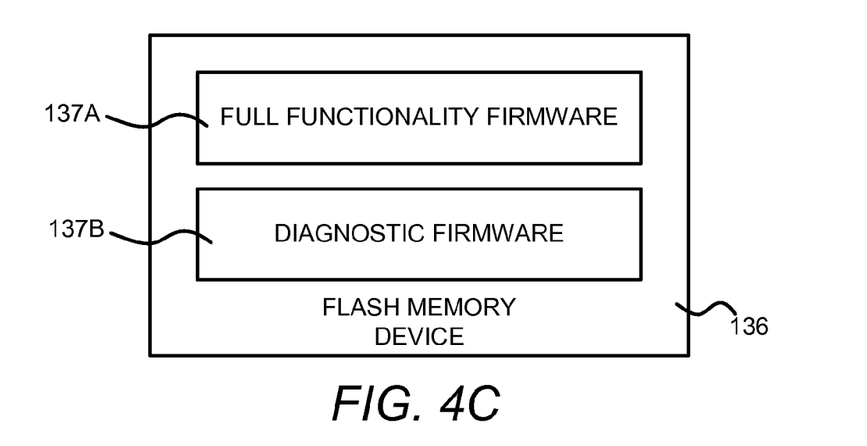

FIG. 4C shows a configuration of the single memory device 126 in which a firmware image 137A for a full functionality firmware and a firmware image 137B for a diagnostic firmware have been stored therein. As mentioned above, a diagnostic firmware provides functionality for diagnosing hardware issues and types of failures. In this example, the full functionality firmware might be utilized to regularly boot the computer 100. If the computer 100 fails in some manner, the recovery firmware might be booted in order to diagnose the failure of the computer 100. In another embodiment, the single memory device 136 includes a full functionality firmware, a recovery firmware, and a diagnostic firmware.

Figure 4D:
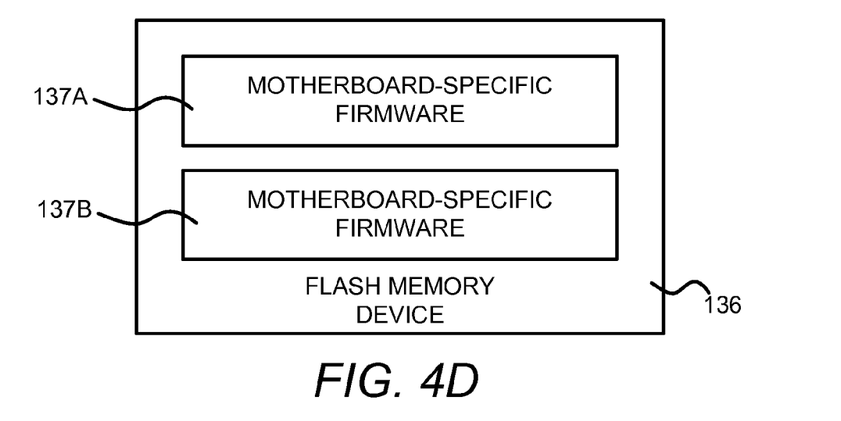

FIG. 4D shows a configuration of the single memory device 126 in which a firmware image 137A for a motherboard-specific firmware and a firmware image 137B for a different motherboard-specific firmware have been stored therein. As mentioned briefly above, a motherboard-specific firmware is a firmware that has been customized for the hardware configuration of a particular motherboard. In the implementation shown in FIG. 4D, multiple different motherboard-specific firmware images have been stored in the same single memory device 136. At boot time, the appropriate motherboard-specific firmware may be selected based upon the hardware configuration of the computer 100. In this way, the same single memory device 136 can be configured to support many different hardware configurations.

Figure 4E:
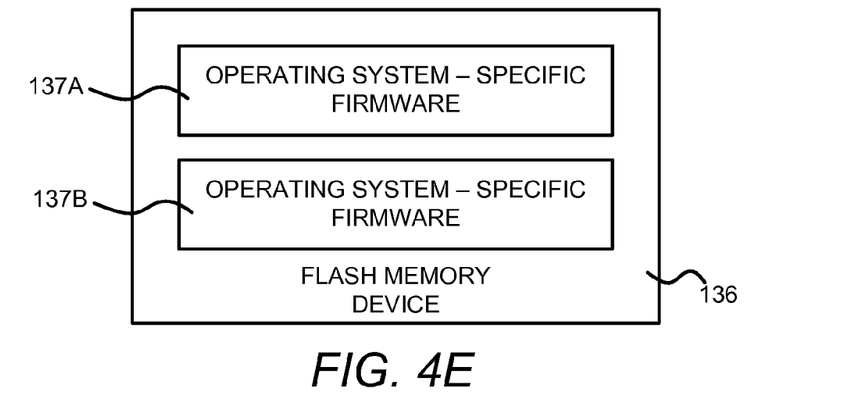

FIG. 4E shows a configuration of the single memory device 126 in which a firmware image 137A for an operating system-specific firmware and a firmware image 137B for a different operating system-specific firmware have been stored therein. As mentioned briefly above, an operating system-specific firmware is a firmware that has been customized for use with a particular operating system. In the implementation shown in FIG. 4E, multiple different operating system-specific firmware images have been stored in the same single memory device 136. At boot time, the appropriate operating system-specific firmware may be selected based upon the operating system used with the computer 100. In this way, the same single memory device 136 can be configured for optimized use with many different operating systems.

Figure 4F:
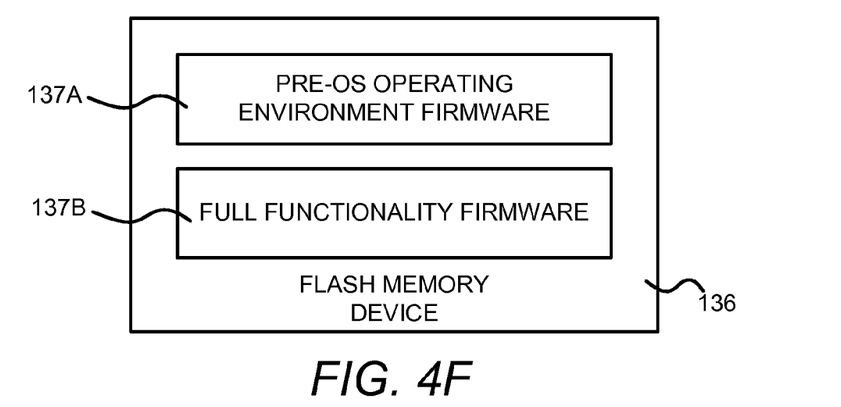

FIG. 4F shows a configuration of the single memory device 126 in which a firmware image 137A for a pre-operating system operating environment firmware and a firmware image 137B for a full functionality firmware have been stored therein. As mentioned above, the pre-operating system operating environment firmware provides a firmware-based execution environment. For example, the firmware-based execution environment might provide functionality for playing digital music files, checking e-mail, or other basic functionality without the need to boot the computer 100 into an operating system. In the implementation shown in FIG. 4F, the pre-operating system operating environment firmware might be utilized to perform various functions without booting into an operating system. When a greater level of functionality is needed, however, the full functionality firmware might be utilized to boot the computer 100.

Figure 4G:
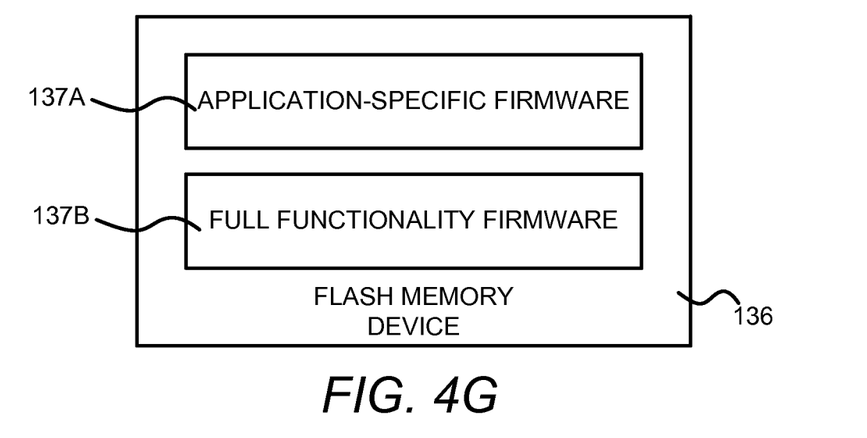

FIG. 4G shows a configuration of the single memory device 126 in which a firmware image 137A for an application-specific firmware and a firmware image 137B for a full functionality firmware have been stored therein. As mentioned above, an application-specific firmware is a firmware that is optimized for use with a particular application, or applications. For example, a firmware image might be provided that is optimized for use with a game or other type of application that has high performance requirements. In the implementation shown in FIG. 4G is utilized, the application-specific firmware might be utilized in conjunction with the application for which the firmware has been optimized. The full functionality firmware might be utilized in conjunction with the execution of other applications. Multiple, different application-specific firmware images 137 might also be stored in the same single memory device 136.

Figure 4H:
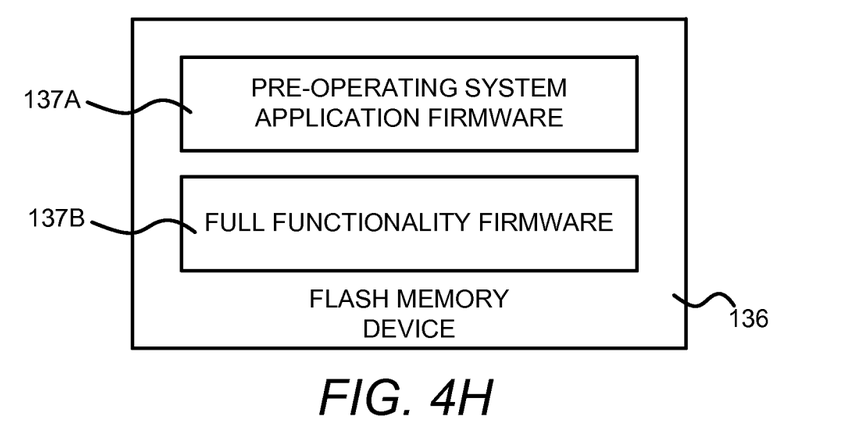

FIG. 4H shows a configuration of the single memory device 126 in which a firmware image 137A for a pre-operating system application firmware and a firmware image 137B for a full functionality firmware have been stored therein. As mentioned above, a pre-operating system application firmware is a firmware that has been configured to execute a particular firmware application. As mentioned above, executing an application by way of the firmware might allow a user to perform certain functionality without booting the computing device into an operating system. In the implementation shown in FIG. 4H, the pre-operating system application firmware might be utilized to take advantage of this functionality. When a greater level of functionality is needed, the full functionality firmware might be utilized to boot the computer 100.

Based on the foregoing, it should be appreciated that technologies for providing multiple firmware image 137 support in a single memory device 136 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method, the method comprising performing computer-implemented operations on a computer comprising a single memory device storing a plurality of bootable firmware images for:

prior to booting the computer, selecting one of the plurality of bootable firmware images stored in the single memory device for booting the computer, the plurality of bootable firmware images comprising two or more of a bootable firmware image comprising a fast-boot firmware, a bootable firmware image comprising a full functionality firmware, a bootable firmware image comprising a full recovery firmware, a bootable firmware image comprising a diagnostic firmware, a bootable firmware image comprising a motherboard-specific firmware, a bootable firmware image comprising an operating system-specific firmware, a bootable firmware image comprising a pre-operating system operating environment firmware, a bootable firmware image comprising an application-specific firmware, or a bootable firmware image comprising a pre-operating system application firmware; and booting the computer using the selected one of the plurality of bootable firmware images.

2. The method of claim 1, wherein the plurality of bootable firmware images comprises the bootable firmware image comprising the fast-boot firmware and the bootable firmware image comprising the full functionality firmware.

3. The method of claim 1, wherein the plurality of bootable firmware images comprises the bootable firmware image comprising the full functionality firmware and the bootable firmware image comprising the recovery firmware.

4. The method of claim 1, wherein the plurality of bootable firmware images comprises the bootable firmware image comprising the full functionality firmware and the bootable firmware image comprising the diagnostic firmware.

5. The method of claim 1, wherein the plurality of bootable firmware images comprises the bootable firmware image comprising the motherboard-specific firmware and the bootable firmware image comprising the different motherboard-specific firmware.

6. The method of claim 1, wherein the plurality of bootable firmware images comprises the bootable firmware image comprising the operating system-specific firmware and the bootable firmware image comprising the different operating system-specific firmware.

7. The method of claim 1, wherein the plurality of bootable firmware images comprises the bootable firmware image comprising the application-specific firmware and the bootable firmware image comprising the full functionality firmware.

8. The method of claim 1, wherein the plurality of bootable firmware images comprises the bootable firmware image comprising the pre-operating system application firmware and the bootable firmware image comprising the full functionality firmware.

9. A non-transitory computer-readable storage medium having computer-executable instructions stored thereupon which, when executed by a computer, cause the computer to:

select one of a plurality of bootable firmware images stored in a single memory device of the computer for use in booting the computer, the plurality of bootable firmware images comprising two or more of a bootable firmware image comprising a fast-boot firmware, a bootable firmware image comprising a full functionality firmware, a bootable firmware image comprising a full recovery firmware, a bootable firmware image comprising a diagnostic firmware, a bootable firmware image comprising a motherboard-specific firmware, a bootable firmware image comprising an operating system-specific firmware, a bootable firmware image comprising a pre-operating system operating environment firmware, a bootable firmware image comprising an application-specific firmware, or a bootable firmware image comprising a pre-operating system application firmware; and boot the computer using the selected one of the plurality of bootable firmware images stored in the single memory device.

10. The non-transitory computer-readable storage medium of claim 9, wherein the plurality of bootable firmware images comprises the bootable firmware image comprising the fast-boot firmware and the bootable firmware image comprising the full functionality firmware.

11. The non-transitory computer-readable storage medium of claim 9, wherein the plurality of bootable firmware images comprises the bootable firmware image comprising the full functionality firmware and the bootable firmware image comprising the recovery firmware.

12. The non-transitory computer-readable storage medium of claim 9, wherein the plurality of bootable firmware images comprises the bootable firmware image comprising the full functionality firmware and the bootable firmware image comprising the diagnostic firmware.

13. The non-transitory computer-readable storage medium of claim 9, wherein the plurality of bootable firmware images comprises the bootable firmware image comprising the motherboard-specific firmware and the bootable firmware image comprising a different motherboard-specific firmware.

14. The non-transitory computer-readable storage medium of claim 9, wherein the plurality of bootable firmware images comprises the bootable firmware image comprising the operating system-specific firmware and the bootable firmware image comprising a different operating system-specific firmware.

15. The non-transitory computer-readable storage medium of claim 9, wherein the plurality of bootable firmware images comprises the bootable firmware image comprising the application-specific firmware and the bootable firmware image comprising the full functionality firmware.

16. The non-transitory computer-readable storage medium of claim 9, wherein the plurality of bootable firmware images comprises the bootable firmware image comprising the pre-operating system operating environment firmware and the bootable firmware image comprising the full functionality firmware.

17. A computing device, comprising:
a central processing unit; and
a single memory device storing
a plurality of bootable firmware images, each of the bootable firmware images comprising instructions executable on the central processing unit for booting and operating the computing device, and
instructions which, when executed by the central processing unit, cause the central processing unit to
select one of the plurality of bootable firmware images stored in the single memory device for use in booting the computing device, the plurality of bootable firmware images comprising two or more of a bootable firmware image comprising a fast-boot firmware, a bootable firmware image comprising a full functionality firmware, a bootable firmware image comprising a full recovery firmware, a bootable firmware image comprising a diagnostic firmware, a bootable firmware image comprising a motherboard-specific firmware, a bootable firmware image comprising an operating system-specific firmware, a bootable firmware image comprising a pre-operating system operating environment firmware, a bootable firmware image comprising an application-specific firmware, or a bootable firmware image comprising a pre-operating system application firmware, and boot the computing device using the selected one of the plurality of bootable firmware images.

18. The computing device of claim 17, wherein the plurality of bootable firmware images comprises the bootable firmware image comprising the fast-boot firmware and the bootable firmware image comprising the full functionality firmware.

19. The computing device of claim 17, wherein the plurality of bootable firmware images comprises the bootable firmware image comprising the full functionality firmware and the bootable firmware image comprising the recovery firmware.

20. The computing device of claim 17, wherein the plurality of bootable firmware images comprises the bootable firmware image comprising the full functionality firmware and the bootable firmware image comprising the diagnostic firmware.

21. The computing device of claim 17, wherein the plurality of bootable firmware images comprises the bootable firmware image comprising the motherboard-specific firmware and the bootable firmware image comprising the different motherboard-specific firmware.

22. The computing device of claim 17, wherein the plurality of bootable firmware images comprises the bootable firmware image comprising the operating system-specific firmware and the bootable firmware image comprising a different operating system-specific firmware.

23. The computing device of claim 17, wherein the plurality of bootable firmware images comprises the bootable firmware image comprising the application-specific firmware and the bootable firmware image comprising the full functionality firmware.

24. The computing device of claim 17, wherein the plurality of bootable firmware images comprises the bootable firmware image comprising the pre-operating system application firmware and the bootable firmware image comprising the full functionality firmware.

* * * * *